United States Patent
Samadani et al.

(10) Patent No.: US 8,780,161 B2
(45) Date of Patent: *Jul. 15, 2014

(54) SYSTEM AND METHOD FOR MODIFYING IMAGES

(75) Inventors: Ramin Samadani, Palo Alto, CA (US); Chen Wu, Stanford, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 442 days.

This patent is subject to a terminal disclaimer.

(21) Appl. No.: 13/038,230

(22) Filed: Mar. 1, 2011

(65) Prior Publication Data

US 2012/0224019 A1    Sep. 6, 2012

(51) Int. Cl.
| | |
|---|---|
| H04N 7/14 | (2006.01) |
| H04N 5/225 | (2006.01) |
| G03B 17/12 | (2006.01) |
| H04N 5/325 | (2006.01) |
| H04N 5/235 | (2006.01) |
| H04N 9/09 | (2006.01) |

(52) U.S. Cl.
CPC ............. *H04N 7/142* (2013.01); *H04N 5/325* (2013.01); *H04N 5/2354* (2013.01); *H04N 9/09* (2013.01)
USPC ..................... 348/14.01; 250/208.1; 250/330; 250/332; 250/559.38; 345/158; 345/175; 345/419; 348/46; 348/72; 348/164; 348/223.1; 348/375; 351/200; 351/206; 359/894; 382/165; 382/276; 386/254; 396/429; 600/473

(58) Field of Classification Search
CPC ......... H04N 5/33; H04W 88/02; G02B 23/12; G02B 7/14; F41G 1/35
USPC ................ 250/208.1, 226, 330, 332, 559.38; 345/158, 175, 419; 348/14.01, 164, 348/241, 46, 77, 169, 223.1, 72, 217.1, 360, 348/375; 351/206, 200; 358/475; 359/894; 382/165, 276; 600/473; 386/254; 396/429

See application file for complete search history.

(56) References Cited

U.S. PATENT DOCUMENTS

| | | | | |
|---|---|---|---|---|
| 4,016,597 | A * | 4/1977 | Dillon et al. ................... | 348/266 |
| 5,767,980 | A * | 6/1998 | Wang et al. .................... | 358/475 |
| 6,249,311 | B1 * | 6/2001 | Rouse et al. ................... | 348/164 |
| 6,344,874 | B1 | 2/2002 | Helms et al. | |
| 6,410,930 | B1 * | 6/2002 | Revelli et al. ............ | 250/559.38 |
| 6,937,819 | B2 * | 8/2005 | Brough ......................... | 396/429 |

(Continued)

OTHER PUBLICATIONS

Ryu, Sae-Woon, et al., Tangible Video Teleconference System Using Real-time Image-based Relighting, IEEE Transactions on Consumer Electronics, vol. 55, No. 3, Aug. 2009, pp. 1162-1168.

(Continued)

*Primary Examiner* — Gerald Gauthier (57) ABSTRACT

The present invention describes a method of modifying an image in a video that includes the step of capturing a visible light image of an area, where the visible light image captured at a first frame rate. The method in addition includes the step of capturing a corresponding infrared light image of an area, the infrared light image being captured when the area is illuminated with an infrared light source, the infrared light image captured at the substantially the same frame rate as the visible light image. Based on the infrared light image, at least a subset of the human perceptible characteristics of the captured visible light image are modified.

13 Claims, 8 Drawing Sheets

(56) References Cited

U.S. PATENT DOCUMENTS

| | | | |
|---|---|---|---|
| 7,170,046 B2 * | 1/2007 | Higashitsutsumi | 250/226 |
| 7,535,002 B2 * | 5/2009 | Johnson et al. | 250/332 |
| 7,629,565 B2 * | 12/2009 | Tanimoto | 250/208.1 |
| 7,796,168 B1 * | 9/2010 | Kostrzewa et al. | 348/241 |
| 8,054,346 B2 * | 11/2011 | Numata | 348/241 |
| 8,055,073 B1 * | 11/2011 | Flagg et al. | 382/173 |
| 8,125,543 B2 * | 2/2012 | Cho | 348/241 |
| 8,199,108 B2 * | 6/2012 | Bell | 345/158 |
| 8,229,548 B2 * | 7/2012 | Frangioni | 600/473 |
| 8,274,559 B2 * | 9/2012 | Amling et al. | 348/72 |
| 8,357,899 B2 * | 1/2013 | Liu et al. | 250/332 |
| 8,393,736 B2 * | 3/2013 | Shikaumi et al. | 351/206 |
| 8,403,480 B2 * | 3/2013 | Chen et al. | 351/200 |
| 8,553,103 B1 * | 10/2013 | Samadani et al. | 348/223.1 |
| 2003/0173518 A1 * | 9/2003 | Ozaki | 250/330 |
| 2004/0005086 A1 | 1/2004 | Wolff et al. | |
| 2005/0249381 A1 | 11/2005 | Silvester et al. | |
| 2007/0058860 A1 | 3/2007 | Harville et al. | |
| 2007/0291466 A1 | 12/2007 | Krestakos et al. | |
| 2008/0298571 A1 | 12/2008 | Kurtz et al. | |
| 2009/0019188 A1 | 1/2009 | Mattice et al. | |
| 2009/0050806 A1 * | 2/2009 | Schmidt et al. | 250/332 |
| 2009/0128334 A1 * | 5/2009 | Starr et al. | 340/572.1 |
| 2009/0175555 A1 | 7/2009 | Mahowald | |
| 2009/0273661 A1 | 11/2009 | Mauchly | |
| 2010/0118149 A1 * | 5/2010 | Levin et al. | 348/169 |
| 2010/0177184 A1 * | 7/2010 | Berryhill et al. | 348/77 |
| 2010/0225617 A1 * | 9/2010 | Yoshimoto et al. | 345/175 |
| 2010/0309315 A1 * | 12/2010 | Hogasten et al. | 348/164 |
| 2010/0328475 A1 | 12/2010 | Thomas et al. | |
| 2011/0002536 A1 * | 1/2011 | Thomasson et al. | 382/165 |
| 2011/0040191 A1 * | 2/2011 | Kyle et al. | 600/473 |
| 2011/0205240 A1 | 8/2011 | Marks et al. | |
| 2011/0205651 A1 * | 8/2011 | Yamano et al. | 359/894 |
| 2011/0228096 A1 * | 9/2011 | Friel et al. | 348/164 |
| 2011/0304541 A1 * | 12/2011 | Dalal | 345/158 |
| 2012/0050482 A1 * | 3/2012 | Boross et al. | 348/46 |
| 2012/0224019 A1 * | 9/2012 | Samadani et al. | 348/14.01 |
| 2012/0257163 A1 * | 10/2012 | Dyer et al. | 351/206 |
| 2012/0315018 A1 * | 12/2012 | Gohshi et al. | 386/254 |
| 2013/0009950 A1 * | 1/2013 | Ben-David et al. | 345/419 |

OTHER PUBLICATIONS

Sun, M. et al., Active Lighting for Video Conferencing, Manuscript Submission to TCSVT: Active Lighting, IEEE, 2009, pp. 1-9.

Wang, O. et al., Video Relighting Using Infrared Illumination, Eurographics 2008, vol. 27, No. 2, 2008, 9 pages.

* cited by examiner

SYSTEM AND METHOD FOR MODIFYING IMAGES

BACKGROUND

In video conferencing sessions, poor lighting can result in unevenly lit images with harsh, sharp shadows and potentially clipped highlight regions. Some video conferencing solutions strictly control the ambient light to produce the desired image quality. However, strictly controlled lighting can be expensive to implement and is often not practical for informal video conferencing sessions. One video conferencing solution uses video captured in the infrared (IR) light range at high frame rates compared to the visible light capture to modify visible light video using image based rendering. Another video conferencing solution calculates surface normals before relighting the video with light in the IR range. This solution requires an IR frame rate at least three times faster than visible frame. The higher frame rates required by some solutions requires additional bandwidth, additional computation and storage and additional power consumption for processing compared to lower frame rate solutions.

BRIEF DESCRIPTION OF DRAWINGS

The figures depict implementations/embodiments of the invention and not the invention itself. Some embodiments are described, by way of example, with respect to the following figures.

The drawings referred to in this Brief Description should not be understood as being drawn to scale unless specifically noted.

DETAILED DESCRIPTION OF THE EMBODIMENTS

For simplicity and illustrative purposes, the principles of the embodiments are described by referring mainly to examples thereof. In the following description, numerous specific details are set forth in order to provide a thorough understanding of the embodiments. It will be apparent, however, to one of ordinary skill in the art, that the embodiments may be practiced without limitation to these specific details. Also, different embodiments may be used together. In some instances, well known methods and structures have not been described in detail so as not to unnecessarily obscure the description of the embodiments.

In video conferencing sessions, poor lighting can result in unevenly lit images with harsh, sharp shadows and potentially clipped highlight regions. The present invention provides a system and method for improving the appearance of video conferencing participants captured in the visible light range by using controlled IR illumination to assist in the video enhancement of the participants. The current system and method takes information that is available in the IR light range images that is not available in the visible light range images and uses the IR light range image information to supplement or enhance the video in the visible light range. For example, for images captured in the visible light range that are too dark, information from the images captured in the IR range can be used to modify the brightness of the captured visible range image.

The method provided captures IR video at the same frame rate or approximately the same frame rate as the video captured in the visible light range. Because much lower IR frame rates are used compared to previous solutions, the described system reduces power consumption, reduces bandwidth requirements, and reduces computation and storage requirements compared to higher frame rate solutions.

Figure 1:
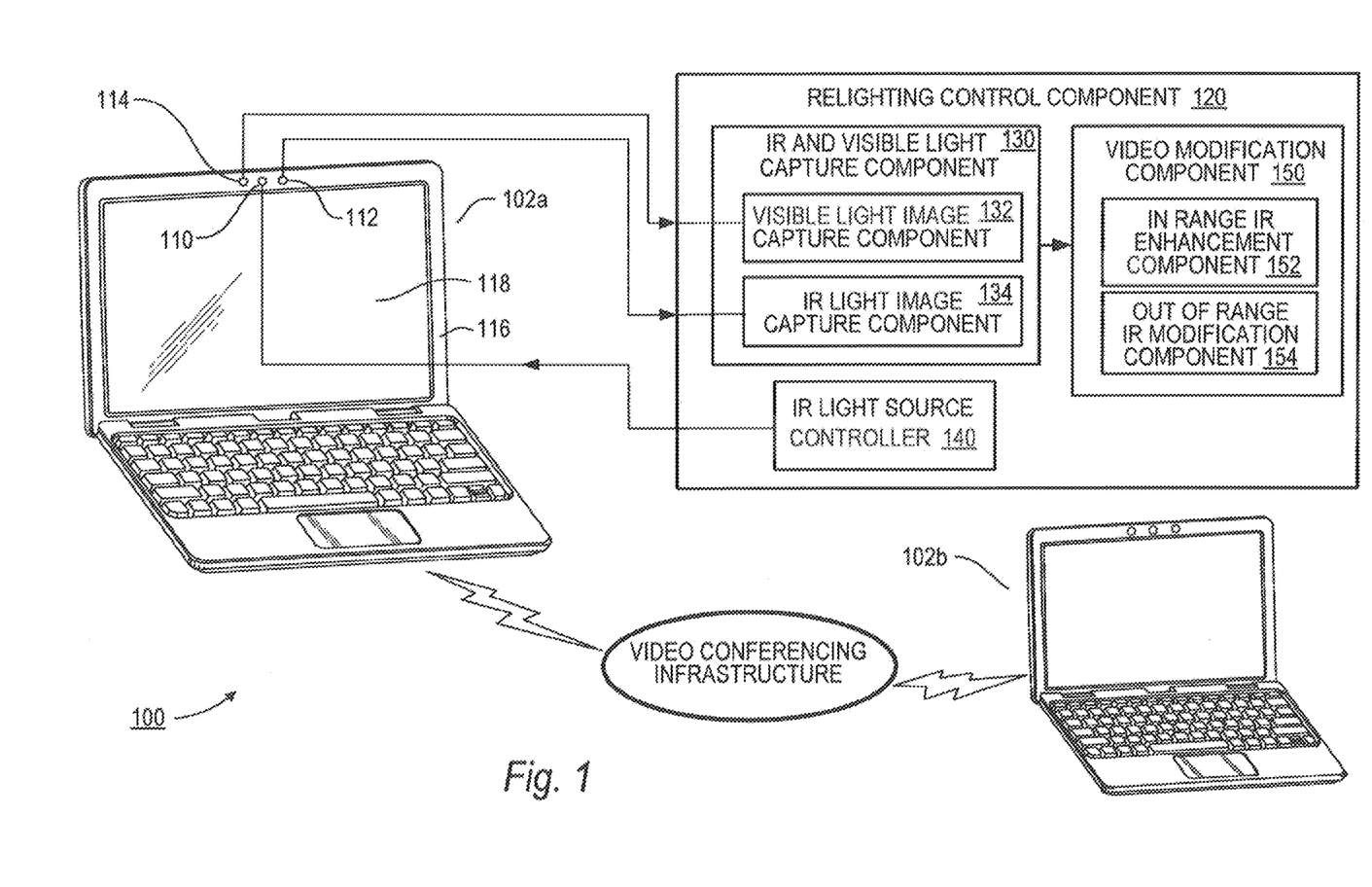
FIG. 1 illustrates a block diagram of a computer system with an IR light source for video conference relighting according to an embodiment of the invention.

FIG. 1 illustrates a block diagram of a video conferencing system 100 including computing systems 102a, 102b with an IR light source 110 for video conference relighting according to an embodiment of the invention. Referring to FIG. 1, for purposes of example the computing systems 102a, 102b shown are laptop computers. Tthe laptop 102a captures video of the local participant (not shown) positioned in the area or region in front of the display-screen while laptop 102b captures a remote participant (not shown) of the video conferencing session. In one embodiment, the video conference of the remote participant is displayed on the display screen 118 of the laptop computer 102a while concurrently an image of the local participant is captured by a local video camera capture system 130.

In the embodiment shown, the image of the local participant is captured by two separate video camera systems in the laptop 102a —a first video camera 112 capable of capturing images of the Ideal participant in the visible light range and a second video camera system 114 capable of capturing video images or frames of the local participant in the infrared light range. In one embodiment, both the camera for video capture in the IR range 114 and the camera for video capture in the visible range 112 are embedded in the frame 116 or bezel of the display screen. In addition, in one embodiment, the controlled IR light source 110 is embedded in the frame or bezel of the display screen.

Referring to FIG. 1 shows an IR illumination source 110 that illuminates a region or area in front of the display screen of the computer system. Although the visible light illuminating the area in front of the display screen is variable to the participant's environment, in most cases the IR light is controlled and based solely on the output of the IR illumination source 110. Because the ambient IR light in most video conferencing environments is negligible, we can assume the light in the captured IR image is from the controlled light output from the IR light source.

Referring to FIG. 1 shows a relighting control component 120 that includes an IR and Visible Range Light Capture Component 130, an IR Light Source Controller Component 140 and a Video Modification Component 150. The relighting control component 120 controls the IR illumination source and uses both the images captured in the IR light frequencies and the visible light frequencies to modify the visible light image of the local participant. The modified visible light image is an enhanced image. This enhanced image of the local participant is then transmitted to the remote participant(s) in the video conference.

Figure 2:
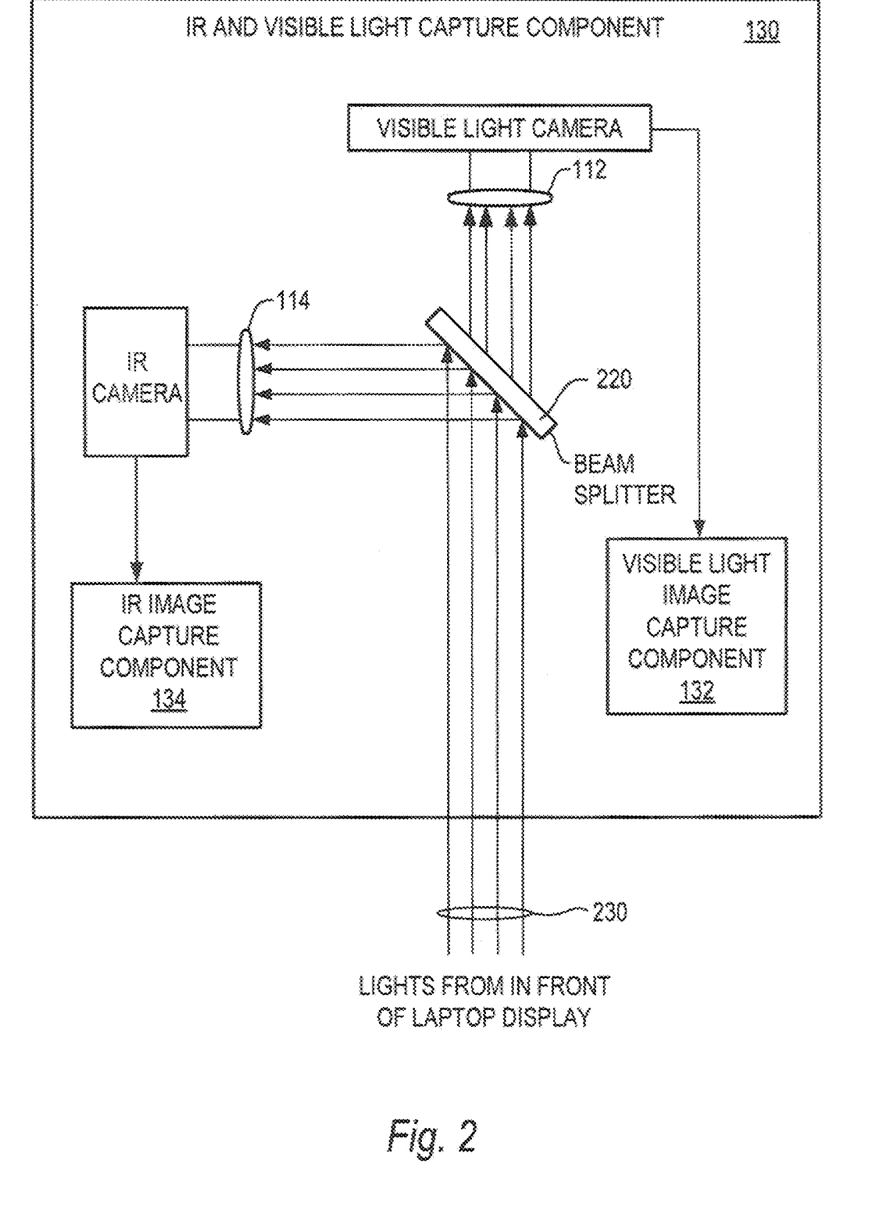
FIG. 2 illustrates a block diagram further detailing the IR and Visible Light Capture Component of the computer system shown in FIG. 1 according to an embodiment of the invention.

FIG. 2 illustrates a block diagram further detailing the IR and Visible Light Capture Component 150 of the computer system shown in FIG. 1 according to an embodiment of the invention. Referring to FIG. 2, the IR and Visible Light Capture Component 130 includes a video camera 114 capable of capturing video frames in the infrared light region, a video camera 112 capable of capturing an video images or frames in the visible light range, and a beam splitter 220. Although in theory a single video camera could be used to produce both video in the IR range and video in the visible range, currently a single video capture device that creates video frames in both the IR and visible light ranges is not commercially available. Thus, in the embodiment shown in FIG. 2, the IR capture and visible light video cameras are separate devices.

Both ambient visible light and IR light from the controlled IR light source illuminate the region in front of the display screen. Referring to FIG. 2, light 230 from the capture zone of the display screen hits the beam splitter 220 and is split so that visible light is reflected or input into the visible light video camera while light in the IR range is reflected or input into the IR light video camera 114. In one example, filters are used in the beam splitter 220—one to eliminate IR (leaving visible light only) and another which filters visible light out (leaving IR light only). Thus one camera is sensitive to only visible light and the other is only sensitive to IR light. In another example, instead of the beam splitter including the previously described filters, one camera has an IR light blocking filter, thus receiving mostly visible light, and the other camera has a visible light blocking filter, thus receiving mostly IR light.

In one embodiment, the frame rate of the IR video camera 114 and the visible range video camera 112 are the same. In one example, the IR camera 114 and the visible light range cameras 112 are synchronized by sending an initialization signal to both cameras so that their image captures both start at the same time.

Images from the IR video camera and the visible light video camera are stored in the IR Light Image Capture Component 134 and the Visible Light Capture Component 132. In some cases, additional processing used to enhance or modify the IR captured or visible light captured images may also be performed in the IR Light Capture Component 134 or the Visible Light Capture Component 132. IR Light and Visible Light images and data about the images are transferred to the Video Modification Component 150. The Video Modification Component 150 modifies the visible light range video dependent upon whether the pixels in the visible range image are in range or out of range. Whether the pixels in the visible light range image are in range or out of range, both the In Range IR Enhancement Component 152 and the Out of Range Modification Component 154 use information from the IR image to enhance the visible range image. How the video is modified is explained further with respect to the method shown in described in FIGS. 3A-3C.

A light from the IR light source 110 illuminates the region in front of the display. The amount of illumination and the timing of the illumination, for example, are controlled by the IR Light Source Controller 140. In one embodiment, the IR Light source 110 is always on when the video cameras are on. In another embodiment, the timing when the IR light source 110 is on is coordinated with the frame rate of the video camera so that the illumination of the IR light source 110 is timed to be illuminated in the time period shortly before and during the time when the video in the IR light range is captured.

In the embodiment shown in FIG. 1, the computing system 102a utilizes only a single IR light 110. This is an advantage compared to some other solutions which are implemented using at least three different IR light sources. However, in an alternative embodiment instead of a single IR light source 110 as shown in FIG. 1, the computing system could have multiple IR light sources. For example, in one embodiment a plurality of IR light sources could be positioned around the frame of the display screen. The IR lighting sources could have the same intensity or different intensities. Say for example, one IR light source could be lit with a higher intensity and another light source could be lit with a light source having a lower intensity. Using differing light intensities would allow, for example, using a lesser intensity dimmer light to fill the shadows left from a higher intensity light source from the other side of the display screen or from a light source at a different angle from the display screen.

In one embodiment, there is preferably a fixed lighting pattern. However, the fixed light source pattern isn't required to be a fixed pattern from a single light source. In addition, although the described system does not allow fully free relighting from any direction, the IR lights may be preset to come from a desired direction (for each participant) and consistently light multiple participants at different workstations, for example, from the same predetermined direction.

Figure 3A:
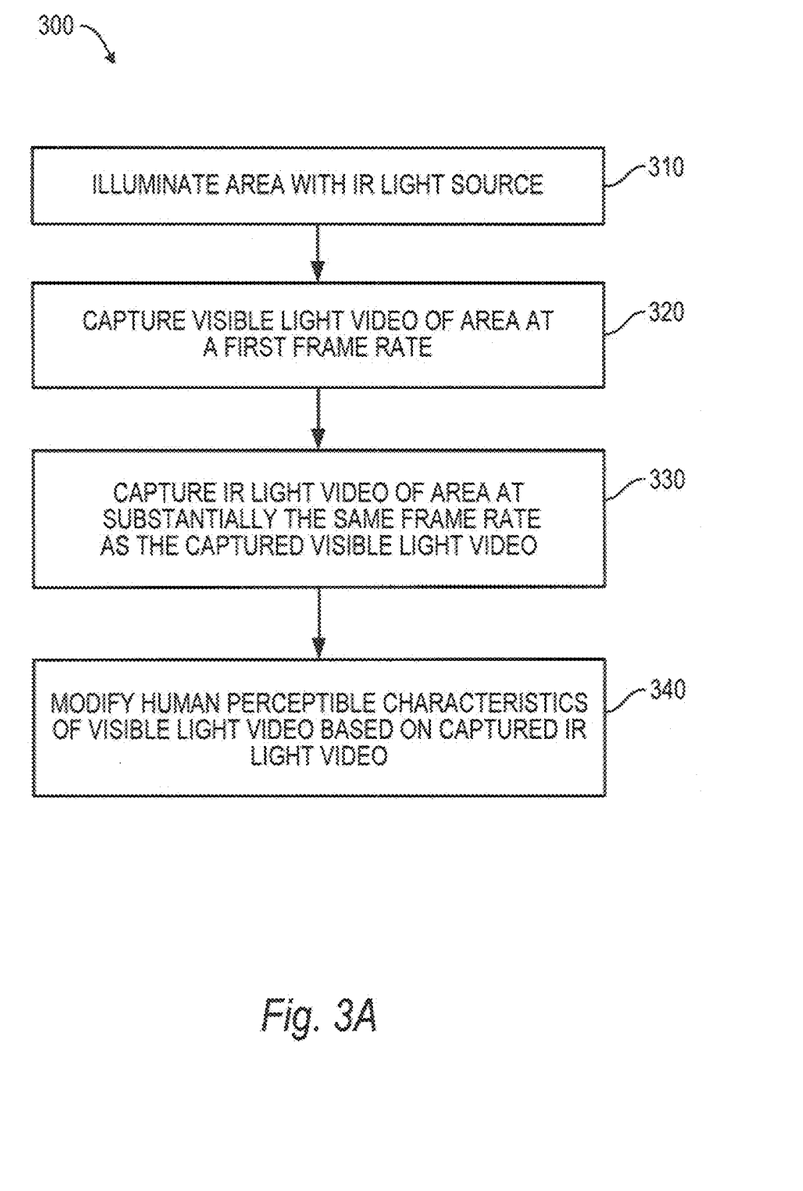
FIG. 3A illustrates a flow diagram of a method for enhancing the human perceptible qualities in a video captured in the visible light spectrum according to an embodiment of the invention.
Figure 3B:
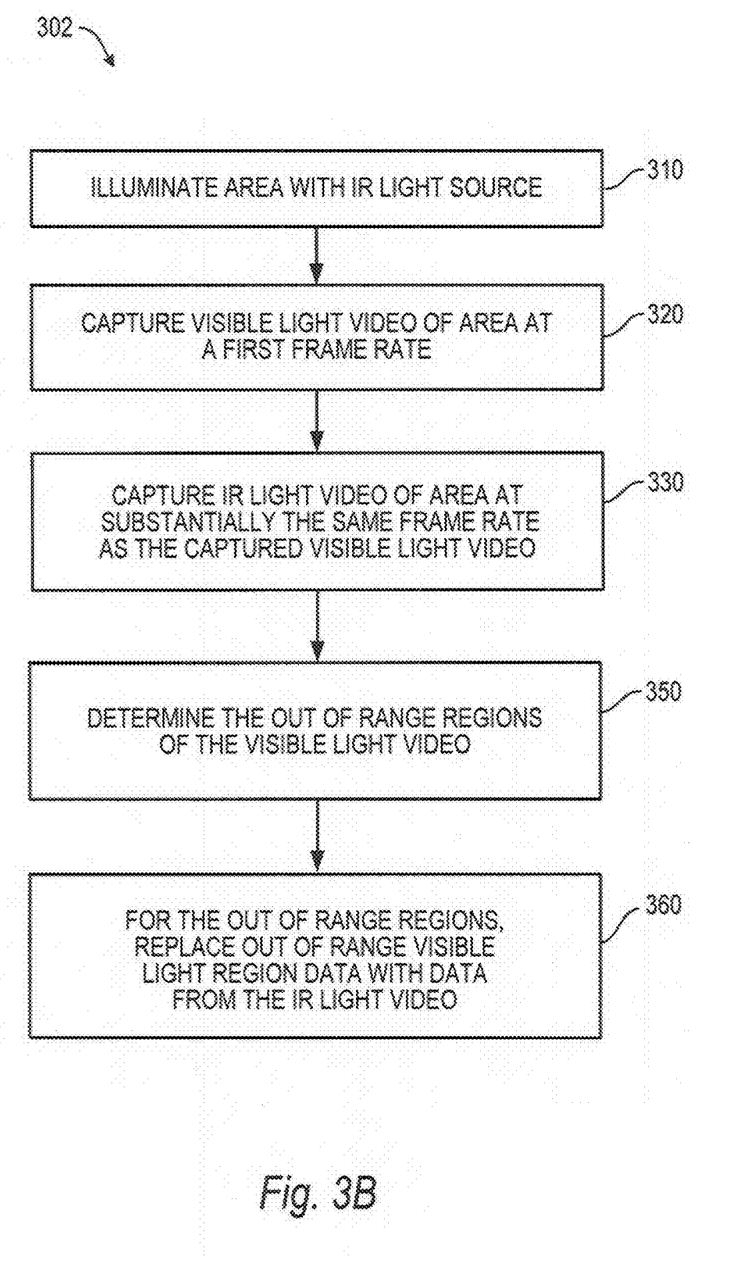
FIG. 3B illustrates a flow diagram of a method for enhancing the video captured in the visible light spectrum when the pixels in the visible light video are out of range, the method utilizing information from video captured in the infrared light range according to an embodiment of the invention.
Figure 3C:
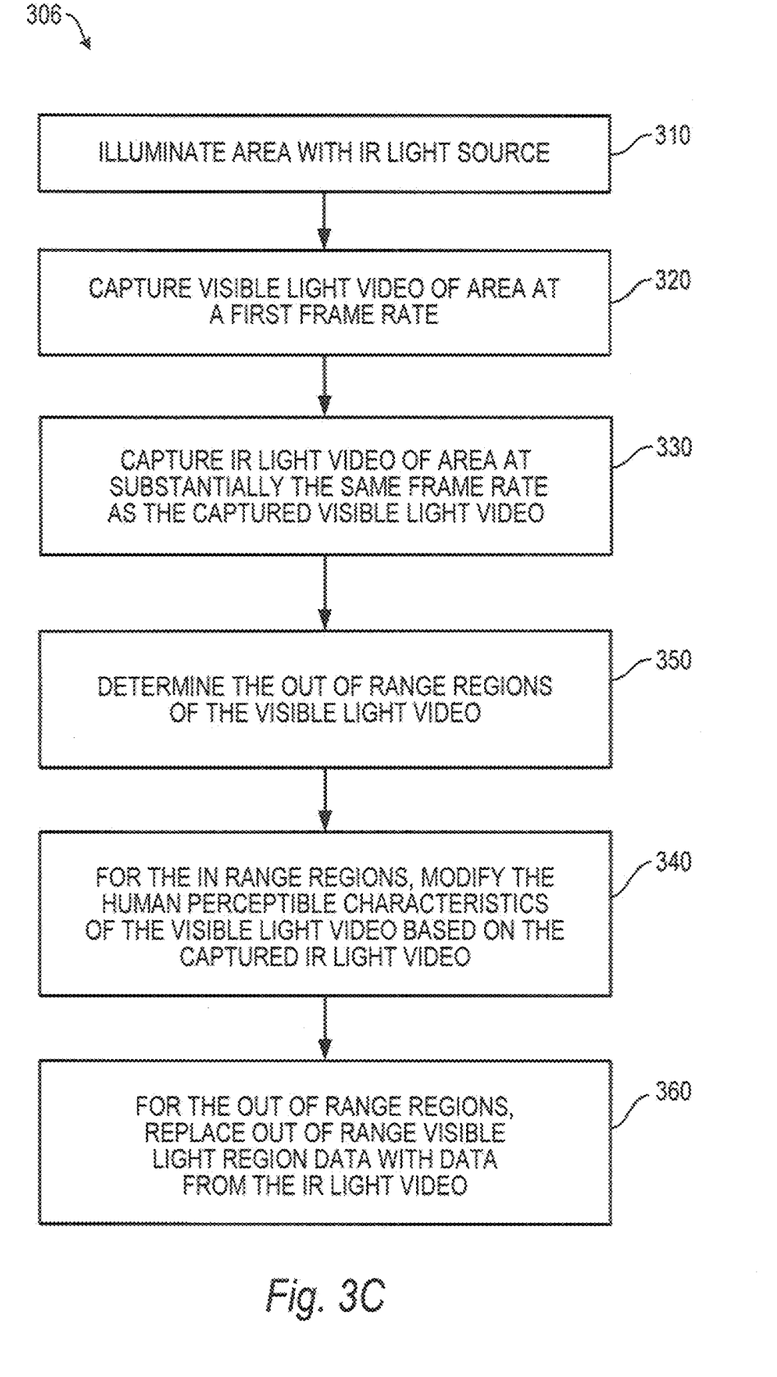
FIG. 3C illustrates a flow diagram of a method for modifying video captured in the visible light spectrum based on whether the pixels in the visible light image are in range or out of range according to an embodiment of the invention.

FIGS. 3A, 3B and 3C all illustrate a flow diagram of a method for enhancing the human perceptible qualities in a visible image according to an embodiment of the invention. How the visible image is enhanced is dependent upon whether the pixels in the visible image are in range or are out of range. In one embodiment shown in FIG. 3A, all the pixels of the visible image are enhanced using a uniform method. In another embodiment shown in FIG. 3B, only the pixels that are out of range in the visible image are enhanced. In another embodiment shown in FIG. 3C, the pixels that are in range in the visible image and the pixels out of range in the visible image are both enhanced but with different methods.

Referring to FIG. 3A for example, shows a method of enhancing video in the visible range comprising the steps of: capturing video of an area, wherein the video captured is in the visible light range, wherein the video is captured at a first frame rate (step 320); capturing video of the area, wherein the video captured is in the infrared light range, wherein the infrared video is captured at substantially the same frame rate as the video captured in the visible light range (step 330); and using the captured infrared video as a reference, wherein based on the captured infrared reference video, adjusting at least a subset of the human perceptible characteristics of the captured visible light video (step 340).

The method shown in FIG. 3A uses the additional IR information available in IR video images to conduct relighting enhancement of the visible light image. In one example, the human perceptible characteristic that is modified in the video image is the brightness of the visible image. The steps one embodiment of the invention include the following: illuminating one or more controlled IR lights (step 310); concurrently, at the same low frame rate as capturing the visible light and IR light images (steps 320, 330); and determining the ratio of brightness of skin in the IR frames and the visible frames of the captured images. In one embodiment where brightness is the human perceptible characteristic, the skin brightness ratio is used in step 340 to determine how to modify the human perceptible characteristic of the visible range video. One way to determine the ratio of skin brightness is to compute the albedo ratio for the participant's, skin. The term "albedo" refers to the reflectivity of an object and where the object is the participant, the albedo ratio of the paritici- pant's skin is computed by first detecting the image pixels in the video that are skin regions and computing the ratio of the skin in the visible and IR light ranges. Then statistics are computed (90% of max, for example) to determine an ideal ratio to use.

The method described with respect to FIG. 3A, include the steps of capturing video (steps 320 and 330) in both the visible light ranges and the IR light ranges. For typical modern indoor settings, with fluorescent or LED light sources, there is no strong IR present in visible ambient light sources. To provide an IR light source, a separate IR light source 110 is used. When the video is being captured, the IR light source shown embedded in the display screen frame is on.

In the method described with respect to FIGS. 3A-3C, providing an IR light source is described by step 310 which defines illuminating the area with an IR light source. In one example, the IR light emitted is in the invisible near infrared range. When doing desktop to desktop or mobile device to mobile device video conferencing or some combination of computing device to another computing device, the computing device often has a display screen which both the local and remote participants in the video conference position themselves in front of. Thus, in one embodiment, the region that is being illuminated is the area in front of the display screen of the computing device which provides a clear view of the participant.

One reason for illumination of the area in front of the display screen (illumination of the participant) using an IR light source is that the captured IR image has several properties that make it useful for enhancing the visible light frames or images captured the video. First, the controlled IR light source gives a desired level of foreground illumination without distracting the participant with bright visible lights. Second, foreground segmentation using IR images is easier since the foreground is much brighter than the background for common video conferencing sessions due to the participant face's short distance to the IR LEDs that are used as the infrared light source. Third, the IR images have details in regions where the visible light image pixels are clipped due to strong light. Such details can be used to enhance the visible light image.

Information from the visible light image can be used in the following ways. From the visible light image you can get chrominance or skin color information. Further, in the dark regions of the visible light images you can often extract good luminance and chrominance details. In addition, from the uncontrolled visible light you can get information on how much to correct in comparison to the IR image. In one embodiment where the pixels in the visible light image are out of range, first the illumination level from the ambient light in the visible range is estimated and corrected in comparison to the illumination level in the IR image. Second, skin color is detected and used (a) to segment the foreground and (b) to build a skin color model for the person for enhancement of the clipped or out of range pixels.

Since the IR light source 110 is close to the user (local participant in the video conference), the IR images captured by the IR video camera look consistent even with different ambient visible light given that there is no strong IR light source present in the visible ambient light source (this is true for typical modern indoor illumination). Thus the IR video frame images have satisfactory illumination even when the captured visible image is dark or has clipped pixel regions with strong light.

In one example, the video frames or images captured by the first video camera system 112 and the second camera system 114 are captured at the same or substantially the same frame rate. Referring to FIG. 3A, video is captured of the area in front of the display screen in the visible light range by the visible light range video camera 112 at a first frame rate. Similarly, video is captured in the area in front of the display screen in the bright infrared light range by the infrared light range video camera 114. In one embodiment, the video of the IR light is captured at the same frame rate (a first frame rate) or substantially the same frame rate as the video in the visible light range is captured. The closer or identical frame rates allow for there to be a close or one-to-one correspondence of the IR and visible light range videos. Thus in step 340 when the videos are compared (the IR light video is used as a reference to be compared to the visible light range video), the correspondence in time of when the videos are captured is the same (if they are captured at the same frame rate) or substantially the same when the video frame capture is synchronized.

Referring to step 340 of FIG. 3A, in one example, the captured IR light video is used as a reference to determine how to modify the captured visible light video. In the embodiment shown in FIG. 1, the determination on how to modify the captured visible light video is performed by the video modification component 150. In one embodiment, the subset of human perceptible characteristics that are modified include illumination and/or color. In one embodiment, the illumination of the captured IR reference video is compared to the illumination in the corresponding captured visible light video frames. In one example, the illumination in the foreground of the visible video frame is adjusted towards the level of the foreground of the IR video frame.

In one embodiment, the human perceptible qualities are the brightness and/or the color of the skin of the participant in the video conference. In order to analyze the skin color and brightness, we must first determine the pixel locations or regions of the image that are the skin of the video conference participant. In one embodiment, this is done by doing skin detection. Although various methods of skin detection are known, in one embodiment the determination of which areas in the image are skin is determined using a chrominance based skin detection combined with an image segmentation based on distance (which may be determined using the IR information).

Figure 4A:
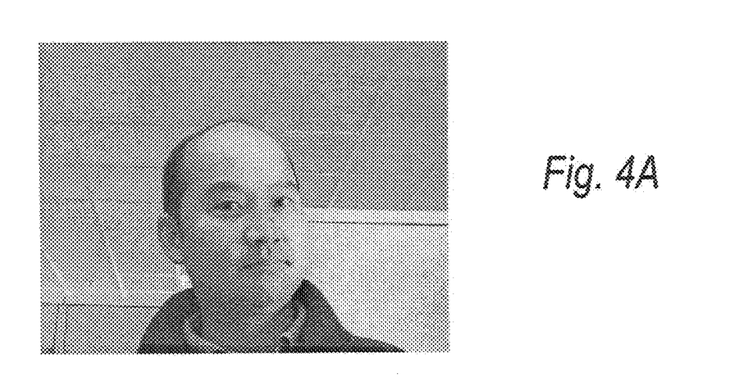
FIG. 4A shows a photographic image of a video frame taken using a video camera capable of capturing images in the visible light range according to an embodiment of the invention.
Figure 4B:
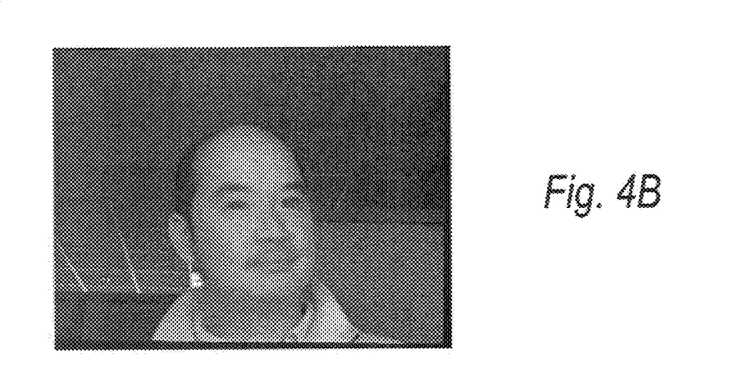
FIG. 4B shows a photographic image of a video frame taken using a video camera capable of capturing images in the infrared light range according to an embodiment of the invention.
Figure 4C:
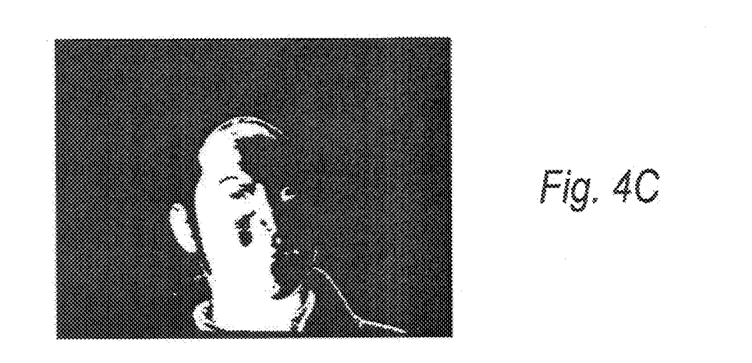
FIG. 4C shows a skin detection mask that identifies areas where skin was detected using a skin detection method applied to the photographic images of the video frames shown in FIGS. 4A and 4B according to ah embodiment of the invention.

Referring to FIG. 4A shows an image of a video conference participant taken in the visible range. From the image captured in the visible light range, skin chrominance values can be determined. YCbCr has been demonstrated as an effective color space for skin classification. In one embodiment, YCbCr is used for skin classification and pixels that satisfy 99<Cb<131 and 134<Cr<166 are classified as skin pixels. FIG. 4B shows an image taken in the infrared range. From the IR captured video image, the distance segmentation values of the local participant from the video camera can be determined. Using both the chrominance values and distance segmentation values, a detected skin mask such as shown in FIG. 4C can be determined. FIG. 4C shows a detected skin mask that identifies area where skin was detected using the skin detection method described above. In one embodiment, the luminance of the areas where skin is detected (skin brightness) is compared in both the visible light image and the IR light images captured. In one example, the skin brightness of the video frames in the visible range are modified to be closer to the skin brightness of the corresponding frames in the IR light range.

The captured visible light video and captured IR video of the local participant are captured at the local participant's computing system. In one embodiment, the modified visible light video from the Video Modification Component 150 of the local participant is transmitted via the Videoconferencing Infrastructure to the remote participant's computing system. In an alternative embodiment, the raw data from the local participant's captured visible light video and the local participant's captured IR video is transmitted via the Videoconferencing Infrastructure to the remote participant's computing system. In this alternative embodiment, the raw data of the local participant is processed by the video modification component of the remote participant's computing system and displayed on the remote participant's display screen.

The embodiment shown in FIG. 3A shows the steps performed to enhance a video frame or series of video frames captured in the visible light range, using data or information captured or derived by captured IR video frames of the same scene. In one embodiment shown in FIG. 3C, the method can be applied to video images where the pixels in the video image are either in range or out of range (pixels are clipped or saturated, for example). In another alternative embodiment, the modification step 360 shown in FIG. 3B is only applied to pixels in the video image that are out of range.

Referring to FIG. 3B shows a method of enhancing video in a video conferencing session comprising the steps of: capturing video of an area, wherein the video captured is in the visible light range, wherein the video is captured at a first frame rate (step 320); capturing video of the area, wherein the video captured is in the infrared light range, wherein the infrared video is captured at substantially the same frame rate as the video captured in the visible light range (step 330); determining the out of range regions of the captured visible light video frames (step 350); and for the out of range regions of the captured visible light video, using pixel data from the video captured in the IR light range to replace the out of range region data (step 360).

Step 360 of the method described with respect to FIG. 3B could be generally described as adjusting or modifying at least a subset of the human perceptible characteristics of the captured visible light image based on the infrared light image (step 340 of FIG. 3A) since in the case of the method described in detail with respect to FIG. 3B, the human perceptible characteristic of luminance is modified. However, the modification or adjustment of the pixels with respect to FIG. 3B is different from the modification that occurs in the method described with respect to FIG. 3A. The method described in FIG. 3B is implemented in one embodiment by replacing pixels in the visible light image with pixels in the IR light image, whereas modification of the pixels in the embodiment described in FIG. 3A requires adjustment of the visible range pixel according to the albedo ratio. Also, the method described with respect to FIG. 3B only requires, some of the modifications implemented be with respect to information from the IR image while others use information from the images in the visible light range. For example, the color mapping uses information from the visible light images.

Figure 5A:
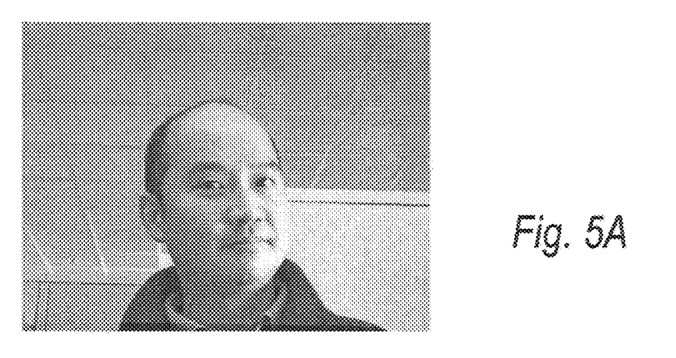
FIG. 5A shows a photographic image of a video frame taken using a video camera capable of capturing images in the visible light range according to an embodiment of the invention.

The embodiment shown in FIG. 3B, is a method directed towards enhancing the visible image when at least a portion of the video or regions of the video captured in the visible light range are considered to be but of range. An example of out of range video, would be video that is clipped or higher than the pixel values where useful information is provided. For example, the photograph shown in FIG. 5A shows an image where there is a strong side light and part of the participant's face appears very bright in the visible image. The pixel values in this very bright region appear to be clipped and are thus are not very informative. In one example, pixels are defined as being out of range or uninformative if at least one of the three RGB channels has a pixel value>250, and being in the foreground (IR pixel value>60).

The approach of the present invention is to use additional IR information to conduct relighting enhancement of the visible light image whenever possible. However, when it is not possible because there is not sufficient information in the visible light image (out of range regions where pixels are out of range (step 350), then we resort to using the IR information. In one embodiment, the pixels or information from the IR image replaces the visible light information or alternatively is blending with the visible light information.

Figure 5B:
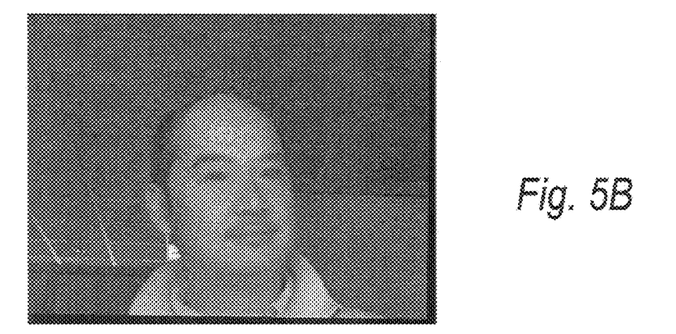
FIG. 5B shows a photographic image of a video frame taken using a video camera capable of capturing images in the infrared light range according to an embodiment of the invention.

FIG. 5A shows a photographic image of a video frame taken using a video camera capable of capturing images in the visible light range according to an embodiment of the Invention. With strong side light, part of the participant's face may appear very bright in the visible image (FIG. 5A) arid pixel values may be clipped and not informative. To enhance the clipped region, we use luminance from a corresponding IR video frame shown in FIG. 5B. FIG. 5B shows a photographic image of a video frame taken using a video camera capable of capturing images in the infrared light range.

In one embodiment, regions (pixels) detected without information in the visible light image (for example, clipped highlight pixels in the visible light image). For these clipped pixels (out of range brightness regions) in the visible range, what we do is take the brightness or luminance information from the IR image. After the brightness of the visible light image is fixed by replacing the luminance values of the visible light image with the luminance values of the IR image, we then need to make sure that the color values are correct. In one embodiment, to ensure that the color values are correct, we use a color map that maps luminance to chrominance. We then use the luminance values of the clipped out of range pixels to generate chrominance values using the color map.

There is no chrominance information in the clipped pixels in either the visible or IR images. Thus, we build a skin color model from the skin region information that is available in the captured visible range video frames. Next, we used the skin color model to recover consistent skin color for the clipped pixels. In one embodiment, the skin color model is based on the assumption that as luminance (Y) changes, chrominance of the skin color (Cb, Cr) changes accordingly. In this case, the skin color model is a mapping from Y to Cb and Cr that can be extracted from pixel values in the captured visible range video in the segmented skin regions. From the derived mapping curve, values corresponding to the luminance Y can be replaced with the Cb/Cr values. For the chrominance channels, the clipped regions are then blended with the other parts of the visible image with pyramid image blending.

Figure 5C:
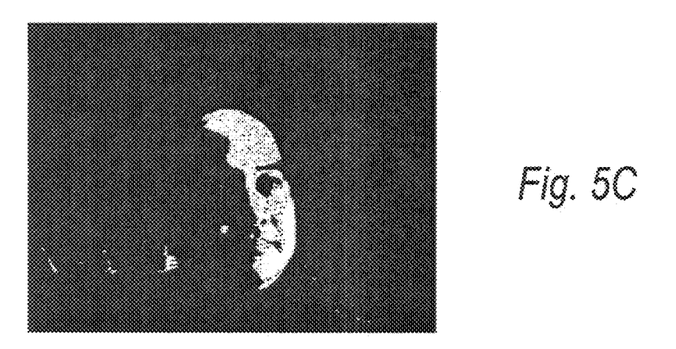
FIG. 5C shows a mask that Identifies regions where the visible image in FIG. 5A is clipped according to an embodiment of the invention.

FIG. 5G shows a mask that identifies area where the visible image in FIG. 5A is clipped according to an embodiment of the invention. The blending mask shown in FIG. 5C is generated from the step 530 of determining the out of range regions in the visible image. In one embodiment, the pixels in the visible light range are replaced with values from a skin color model derived from the visible light image (we find this substantially improves the color appearance).

Figure 5D:
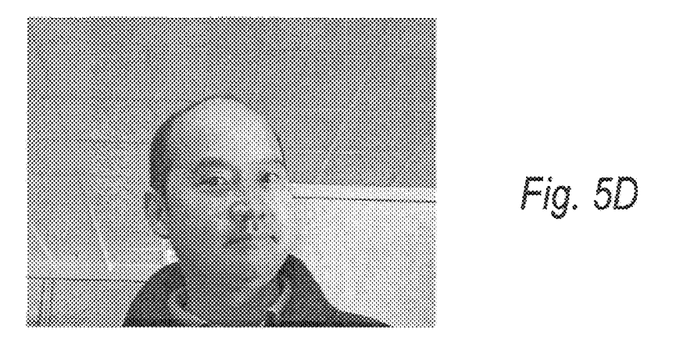
FIG. 5D shows a photographic image of a video frame after applying the mask shown in FIG. 5C for blending pixels from the IR image according to an embodiment of the invention.

In one example, we use the mask shown in FIG. 5C to tells us which colors are out of range and then we blend the colors in these regions smoothly resulting in the image shown in FIG. 5D. In one example, the pixels from the IR light video image are blended with pixels in the visible images using Burt and Adelson pyramid blending to achieve a smooth transition. The blending mask takes the IR values for the clipped pixels and visible luminance (Y in YCbCr) for the other pixels and creates smooth transitions between them. FIG. 5D shows a photographic image of a video frame taken after using the mask shown in FIG. 5C for blending pixels from the IR image according an embodiment of the invention. The described method has the advantage that it does not require a difficult segmentation step (detecting the clipped pixels is easy) which would otherwise be needed since IR response and visible light response differs for each material in the scene.

Although the skin tone (and thus the chrominance) of the video participant changes in the visible range, skin tone variations in the infrared light range variations are much less observable and everyone appears to have roughly the same skin tone. Because we want the participant to maintain their skin tone in the visible range image being modified, we may not want to use the same ratio on a darker skinned person as a person who appears lighter skinned in the visible light range. Thus, in one embodiment, the albedo ratio in the IR image to the visible image changes dependent upon the visible skin tone of the video conference participant. The different albedo ratios based on skin tone create a modified image where the different ratios allow the participant to look more realistic—reflect how they look in the visible light range.

The method shown in FIG. 3B can be applied as the sole enhancement method to modifying the visible image or alternatively in combination with another enhancement method, such as shown in FIG. 3A. If combined, previously performed steps (such as for example steps 310, 320 and 330) would not need to be performed again.

Referring to FIG. 3C shows a method of enhancing video in a video conferencing session where both out of range data and in range data are handled differently based on whether the pixel values in the visible range image are in range or out of range. The method shown in FIG. 3C comprising the steps of capturing video of an area, wherein the video captured is in the visible light range, wherein the video is captured at a first frame rate (step 320); capturing video of the area, wherein the video captured is in the infrared light range, wherein the infrared video is captured at substantially the same frame rate as the video captured in the visible light range (step 330); determining the out of range regions of the captured visible light video frames (step 350); for the in range regions of the captured visible light video, using the captured infrared video as a reference, wherein based on the captured infrared reference video, adjusting at least a subset of the human perceptible quantities of the captured visible light video (step 340); and for the out of range regions of the captured visible light video, using pixel data from the video captured in the IR light range to replace the out of range region data (step 360).

In one embodiment of the invention we assume that the ambient IR light is negligible. However, in cases where there is significant ambient IR light, would improve the enhancements to the visible light image by subtracting out the ambient IR light. In this alternative embodiment, we would do an IR video capture with the IR light source turned off and another video capture with the IR light source turned on. A subtraction between the images with the lights on and off, would subtract out the ambient IR light. This embodiment may be implemented at two times the frame rate of the video captured in the visible light range.

Figure 6:
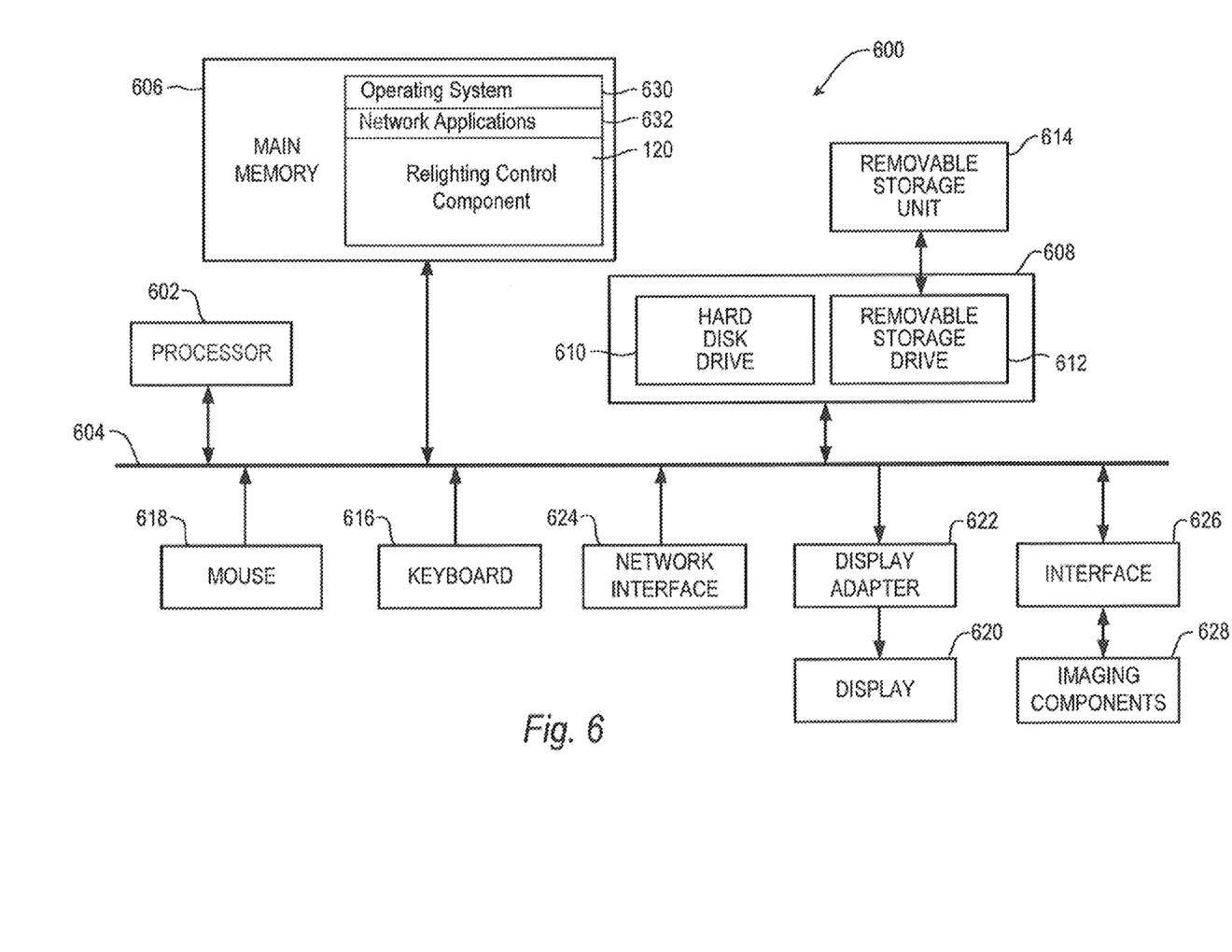
FIG. 6 shows a computer system for implementing the methods shown in FIGS. 3A-3C for video conference relighting according to an embodiment of the invention.

FIG. 6 shows a computer system for implementing the methods shown in FIGS. 3A-3C and described in accordance with embodiments of the present invention. It should be apparent to those of ordinary skill in the art that the methods 300, 302, 306 represent generalized illustrations and that other steps may be added or existing steps may be removed, modified or rearranged without departing from the scopes of the methods 300, 302, 306. The descriptions of the methods 300, 302, 306 are made with reference to the system 100 illustrated in FIG. 1 and the system 600 illustrated in FIG. 6 and thus refers to the elements cited therein. It should, however, be understood that the methods 300, 302, 306 is not limited to the elements set forth in the system 600. Instead, it should be understood that the methods 300, 302, 306 may be practiced by a system having a different configuration than that set forth in the system 600.

Some or all of the operations set forth in the method 400 may be contained as utilities, programs or subprograms, in any desired computer accessible medium. In addition, the methods 300, 302, 306 may be embodied by computer programs, which may exist in a variety of forms both active and inactive. For example, they may exist as software, program(s) comprised of program instructions in source code, object code, executable code or other formats. Any of the above may be embodied on a computer readable medium, which include storage devices and signals, in compressed or uncompressed form.

FIG. 6 illustrates a block diagram of a computing apparatus 600 configured to implement or execute the methods 300, 302, 306 depicted in FIG. 3A-C, according to an example. In this respect, the computing apparatus 600 may be used as a platform for executing one or more of the functions described hereinabove with respect to the relighting control component 120.

The computing apparatus 600 includes one or more processor(s) 602 that may implement or execute some or all of the steps described in the methods 400. Commands and data from the processor 602 are communicated over a communication bus 604. The computing apparatus 600 also includes a main memory 606, such as a random access memory (RAM), where the program code for the processor 602, may be executed during runtime, and a secondary memory 608. The secondary memory 608 includes, for example, one or more hard drives 610 and/or a removable storage drive 612, representing a removable flash memory card, etc., where a copy of the program code for the method 600 may be stored. The removable storage drive 612 reads from and/or writes to a removable storage unit 614 in a well-known manner.

These methods, functions and other steps may be embodied as machine readable instructions stored on one or more computer readable mediums, which may be non-transitory. Exemplary non-transitory computer readable storage devices that may be used to implement the present invention include but are not limited to conventional computer system RAM, ROM, EPROM, EEPROM, hard drives, flash memory and magnetic or optical disks or tapes. Concrete examples of the foregoing include distribution of the programs on a CD ROM or via Internet download.

Although shown stored on main memory 606, any of the memory components described 606, 608, 614 may also store an operating system 630, such as Mac OS, MS Windows, Unix, or Linux; network applications 632; and a display controller component 130. The operating system 630 may be multi-participant, multiprocessing, multitasking, multithreading, real-time and the like. The operating system 630 may also perform basic tasks such as recognizing input from input devices, such as a keyboard or a keypad; sending output to the display 112 controlling peripheral devices, such as disk drives, printers, image capture device; and managing traffic on the one or more buses 604. The network applications 632 includes various components: for establishing and maintaining network connections, such as software for implementing communication protocols including TCP/IP, HTTP, Ethernet, USB, and FireWire.

The computing apparatus 600 may also include an input devices 616, such as a keyboard, a keypad, functional keys, etc., a pointing device, such as a tracking ball, cursors, etc., and a display(s) 110, such as the display 110 shown for example in FIG. 1. A display adaptor 622 may interface with the communication bus 604 and the display 112 and may receive display data from the processor 602 and convert the display data into display commands for the display 620.

The processor(s) 602 may communicate over a network, for instance, a cellular network, the Internet, LAN, etc., through one or more network interfaces 624 such as a Local Area Network LAN, a wireless 802.11x LAN, a 3G mobile WAN or a WiMax WAN. In addition, an interface 626 may be used to receive an image or sequence of images from imaging components 628, such as the image capture device.

The foregoing description, for purposes of explanation, used specific nomenclature to provide a thorough understanding of the invention. However, it will be apparent to one skilled in the art that the specific details are not required in order to practice the invention. The foregoing descriptions of specific embodiments of the present invention are presented for purposes of illustration and description. They are not intended to be exhaustive of or to limit the invention to the precise forms disclosed. Obviously, many modifications and variations are possible in view of the above teachings. The embodiments are shown and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents:

What is claimed is:

1. A method of modifying an image in a video comprising:
    capturing, by a computing device, the video including a visible light image of an area, the video including the visible light image captured at a first frame rate;
    capturing, by the computing device, an infrared video including a corresponding infrared light image of an area, the infrared video including the infrared light image being captured when the area is illuminated with an infrared light source, the infrared video including the infrared light image captured at the substantially the same frame rate as the video including visible light image; and
    based on the infrared light image, adjusting, by the computing device, at least a subset of the human perceptible characteristics of the captured visible light image.

2. The method recited in claim 1 wherein the human perceptible characteristics of the captured visual image include skin brightness.

3. The method recited in claim 2 further including detecting skin in the infrared light image and the corresponding visible light image and determining the skin brightness in the skin regions of the IR image and the visible range image.

4. The method recited claim 3 wherein the skin brightness of the frames in the visible range image is modified to be closer to skin brightness of the frames in the IR range.

5. The method recited in claim 4 further including determining the ratio of skin brightness in an IR frame and a visible light video frame, wherein the ratio of skin brightness is determined by the albedo ratio.

6. A method of modifying an image in a video comprising:
    capturing, by a computing device, the video including a visible light image of an area, the video including the visible light image captured at a first frame rate;
    capturing, by the computing device, an infrared video including a corresponding infrared light image of an area, the infrared video including the infrared light image being captured when the area is illuminated with an infrared light source, the infrared video including the infrared light image captured at the substantially the same frame rate as the video including the visible light image; and
    determining, by the computing device, whether a region of the visible light image is out of range, and for the out of range regions using data from the infrared light image to replace out of range regions in the visible light image.

7. The method recited in claim 6 wherein for the regions of the visible light image that are not out of range, modifying the human perceptible characteristics of the visible light image based on the infrared light image.

8. The method recited in claim 6 wherein for the out of range regions, the luminance values of the pixels in the visible light image are replaced with the luminance value of the pixels in the corresponding IR light image.

9. The method recited in claim 6 further including creating a color map that maps luminance values to chrominance values.

10. The method recited in claim 9 further including using the color map to map the luminance values of the out of range pixels in the visible light image to the chrominance values.

11. The method recited in claim 10 wherein pyramid blending is used to blend the chrominance pixels and the luminance pixels in the visible light image.

12. A system for modifying an image in a video comprising:
    a visible light image capture component for capturing the video including a visible light image of an area, the video including the visible light image captured at a first frame rate;
    an IR light image capture component for capturing an infrared video including a corresponding infrared light image of an area, the infrared video including infrared light image being captured when the area is illuminated with an infrared light source, the infrared video including the infrared light image captured at the substantially the same frame rate as the visible light image; and a video modification component for modifying the visible light image based on the infrared light image, wherein the visible light image is modified by adjusting at least a subset of the human perceptible characteristics of the visible light image.

13. A system for modifying an image in a video comprising:
- a visible light image capture component for capturing the video including a visible light image of an area, the video including the visible light image captured at a first frame rate;
- an IR light image capture component for capturing an infrared video including a corresponding infrared light image of an area, the infrared video including the infrared light image being captured when the area is illuminated with an infrared light source, the infrared video including infrared light image captured at the substantially the same frame rate as the visible light image; and
- a video modification component for determining whether a region of the visible light image is out of range, and for the out of range regions using data from the infrared light image to replace out of range regions in the visible light image.

\* \* \* \* \*

UNITED STATES PATENT AND TRADEMARK OFFICE
CERTIFICATE OF CORRECTION

PATENT NO.       : 8,780,161 B2                     Page 1 of 1
APPLICATION NO.  : 13/038230
DATED            : July 15, 2014
INVENTOR(S)      : Ramin Samadani et al.

It is certified that error appears in the above-identified patent and that said Letters Patent is hereby corrected as shown below:

In the Claims

Column 12, line 15, in Claim 4, after "recited" insert -- in --.

Signed and Sealed this
Tenth Day of February, 2015

Michelle K. Lee
*Deputy Director of the United States Patent and Trademark Office*